United States Patent
Padinhakara et al.

(10) Patent No.: US 10,225,172 B2
(45) Date of Patent: Mar. 5, 2019

(54) TAP TECHNOLOGY SELECTION

(71) Applicant: HEWLETT PACKARD ENTERPRISE DEVELOPMENT LP, Houston, TX (US)

(72) Inventors: Mohammed Javed Padinhakara, Bangalore (IN); Santosh Kumar Singh, Bangalore (IN); Pramod Shanbhag, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1 day.

(21) Appl. No.: 15/501,651

(22) PCT Filed: Apr. 3, 2015

(86) PCT No.: PCT/US2015/024294
§ 371 (c)(1),
(2) Date: Feb. 3, 2017

(87) PCT Pub. No.: WO2016/122694
PCT Pub. Date: Aug. 4, 2016

(65) Prior Publication Data
US 2017/0230270 A1      Aug. 10, 2017

(30) Foreign Application Priority Data
Jan. 29, 2015   (IN) ........................... 0427/CHE/2015

(51) Int. Cl.
*H04L 12/26*   (2006.01)
*H04L 29/06*   (2006.01)

(52) U.S. Cl.
CPC .............. *H04L 43/12* (2013.01); *H04L 43/04* (2013.01); *H04L 43/10* (2013.01); *H04L 63/1408* (2013.01); *H04L 63/1425* (2013.01)

(58) Field of Classification Search
None
See application file for complete search history.

(56) References Cited

U.S. PATENT DOCUMENTS

| | | |
|---|---|---|
| 6,141,690 A | 10/2000 | Weiman |
| 7,209,473 B1 | 4/2007 | Mohaban et al. |
| 7,639,613 B1 | 12/2009 | Ghannadian et al. |

(Continued)

FOREIGN PATENT DOCUMENTS

| | | |
|---|---|---|
| KR | 1020050104106 A | 11/2005 |
| WO | WO-2006062061 A2 | 6/2006 |

OTHER PUBLICATIONS

"Big Tap Monitoring Fabric," Datasheet, 2014, pp. 1-4, Big Switch Networks, Inc.

(Continued)

*Primary Examiner* — Anh Vu H Ly
(74) *Attorney, Agent, or Firm* — Hewlett Packard Enterprise Patent Department (57) ABSTRACT

In one implementation, a method for tap technology can include identification of a plurality of network element primitives of a tap request, a determination of a set of selection criteria based on the plurality of network element primitives, a selection of a tap technology based on a comparison of the set of selection criteria to a tap technology profile, and a configuration of the tap domain to copy packets based on the set of selection criteria.

15 Claims, 5 Drawing Sheets

(56) References Cited

U.S. PATENT DOCUMENTS

| | | | |
|---|---|---|---|
| 7,680,928 B2 | 3/2010 | Lean et al. | |
| 7,849,502 B1* | 12/2010 | Bloch | H04L 29/12066 |
| | | | 726/11 |
| 8,612,570 B1 | 12/2013 | Nair et al. | |
| 8,996,691 B1* | 3/2015 | Stickle | H04L 12/6418 |
| | | | 709/224 |
| 9,032,070 B1* | 5/2015 | Stickle | H04L 12/2626 |
| | | | 709/224 |
| 9,166,992 B1* | 10/2015 | Stickle | H04L 63/1425 |
| | | | 370/250 |
| 9,806,968 B2* | 10/2017 | Matityahu | H04L 43/04 |
| | | | 370/252 |
| 2007/0280123 A1* | 12/2007 | Atkins | H04L 41/142 |
| | | | 370/252 |
| 2017/0237645 A1* | 8/2017 | Shanbhag | H04L 43/12 |
| | | | 370/250 |

OTHER PUBLICATIONS

"IBM SDN VE & VSS Monitoring NPB Deliver Converged Monitoring Fabric for SDN," Feb. 4, 2014, pp. 1-2, VSS Monitoring, Inc.
International Search Report and Written Opinion, International Application No. PCT/US2015/024294, dated Oct. 27, 2015, pp. 1-9, KIPO.
Shashi Kiran and Gary Kinghorn, "Cisco Open Network Environment: Bring the Network Closer to Applications," White Paper, Apr. 2014, pp. 1-14, Cisco.

* cited by examiner

TAP TECHNOLOGY SELECTION

BACKGROUND

Computer networks commonly include switches, routers, and endpoints (such as servers or client devices) that are communicatively connected to transfer information between endpoints. Networks have evolved to include mobile computing devices, personal devices connected to business networks, virtual machines, and even virtual switches. Networks are commonly distributed across vendors of network devices and host multiple solutions, such as orchestration software and middle boxes, to meet daily customer requirements. As networks evolve, the importance of "network visibility" becomes very pertinent from the perspective of auditing, troubleshooting, and network data analytics. Network monitoring solutions can enable a network administrator to "tap" (i.e., copy and/or redirect) traffic at various tapping points in the network and use the tapped traffic for various analysis such as probing, auditing, and anomaly detection.

DETAILED DESCRIPTION

In the following description and figures, some example implementations of network tap apparatus, network tap systems, and/or methods for tap technology selection are described. Network monitoring solutions come in a variety of offerings. Traditionally techniques like sample-based monitoring (e.g., SFLOW), statistics-based monitoring (e.g., NETFLOW), port mirroring (e.g., SPAN), etc. have been widely used for achieving network visibility objectives (e.g., traffic tapping objectives). Software-defined network ("SDN") environments provide opportunities for more precise tapping and traffic analytics because of the centralized visibility and capability to steer and/or copy traffic on a per-flow basis. Network monitoring comes at the cost of using available network bandwidth and a network administrator may find a challenge in identifying which one of the tapping techniques is a best fit for their use case.

Various examples described below relate to providing a framework via a common selection criteria to automatically choose the best tapping technique depending on network administrator's specific use-case. Using a variety of selection criteria, a programmable tap platform can simplify the tapping experience for a network administrator as well as SDN-based applications that request tapped data for analytics by identifying the preferred tap technology and preferred network element to perform the tapping. The platform can provide a vendor-agnostic and protocol-agnostic solution to allow the network administrator to focus on "what to tap" rather than "how to tap."

A network element, as used herein, represents any appropriate device of a network, such as a switch, a router, a middle box, or an endpoint compute device. The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, manage, and/or modify."

Figure 1:
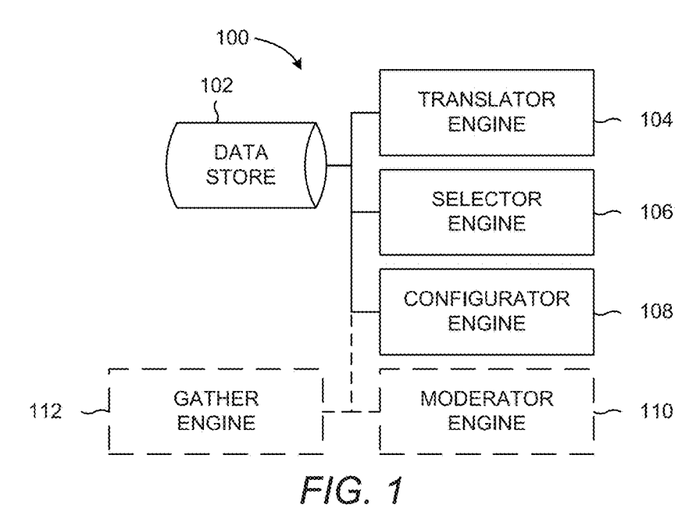
FIGS. 1 and 2 are block diagrams depicting example network tap systems.
Figure 2:
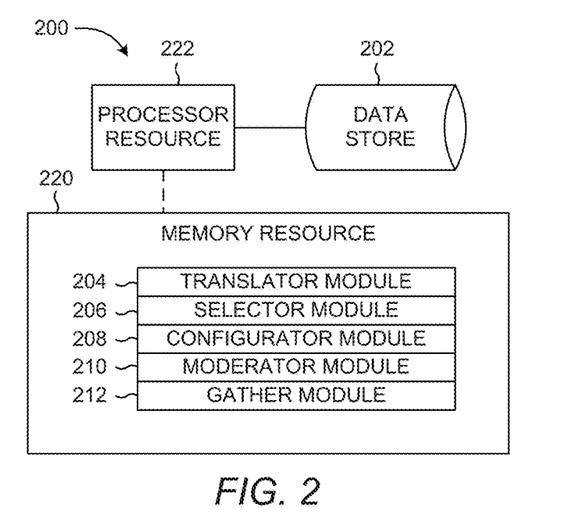

FIGS. 1 and 2 are block diagrams depicting example network tap systems 100 and 200. Referring to FIG. 1, the example network tap system 100 of FIG. 1 generally includes a data store 102, a translator engine 104, a selector engine 106, and a configurator engine 108. In general, the selector engine 106 can identify a tap technology to use on the network based on a tap request translated by the translator engine 104 and configure the tap technology on a network element via the configurator engine 108. The example network tap system 100 can include a moderator engine 110 and a gather engine 112 to obtain information about the network and modify the network tap configuration based on changes to the network.

The translator engine 104 represents any circuitry or combination of circuitry and executable instructions to translate a tap request into a set of tap arguments based on a first mapping of keywords to primitives. For example, the translator engine 104 can be a combination of circuitry and executable instructions to receive a tap request as a high-level instruction, such as "tap traffic of conference room A," and derive tap arguments from the tap request by parsing the tap request and identifying segments that are known to represent a network element primitive. A network element primitive represents an attribute at the network element level, such as a specific physical switch, a port, a media access control ("MAC") address, an internet protocol ("IP") address, a switch-port tuple, and the like.

A mapping of keywords to primitives can include a knowledge base and/or a machine-learned store of terms that can represent a network element primitive. For example, the mapping can contain a data structure associating the string "conference room A" with strings "switch A" and "switch B" (or the MAC addresses associated with the switches A and B, respectively), so the map of keywords can generate the primitives of switch A and switch B when a tap configuration associated with the conference room A is requested. A mapping can represent any data structure or combination of data structures to provide association between identifiers (e.g., numbers, characters, strings, etc.). Example data structures usable as a mapping include an associative array, a tree, a map, a dictionary, and the like. In general, the mappings are used for lookups of associative terms and can be adapted to specific use cases by a network administrator. Mappings can be maintained at a network management source that collects network management information. For example, a mapping can be retrieved from a database of network management information maintained by a network management application, such as a lightweight directory access protocol ("LDAP") management application or a remote authentication dial in user service ("RADIUS") management application.

The translator engine 104 can include components for accomplishing the translation. For example, the translator engine 104 can include a location translator to translate to identify a network element based on a location keyword using logical entities associated with location (e.g., cafeteria, building A, etc.); a user translator to identify a network element associated with a user to tap based on a user keyword by translating a user request to network element primitives (e.g., the switch and/or port used by a specified user); an application translator to identify the network element based on an application keyword by translating the traffic goal or application class (e.g., type of traffic being tapped) to network element primitives (e.g., ports and/or protocols used) of network elements that provide the application service; and a device translator to identify a network element based on a device keyword, such as translate generic terms, such as notebooks or tablets, to a group of network element primitives (e.g., MAC addresses) associated with devices with a configuration associated with the specified generic term. The mappings can include direct translations to primitives or rules to identify primitives to allow for dynamic changes to a network tap configuration. The output of the translator engine 104 can be a set of network element primitives, such as MAC addresses, IP addresses, and/or switch-port tuples that represent low-level designations to network elements of the network.

The selector engine 106 represents any circuitry or combination of circuitry and executable instructions to identify selection criteria and select a tap technology. For example, the selection engine 106 can represent a combination of circuitry and executable instructions to identify selection criteria based on the set of tap arguments and a mapping of arguments to selection criteria and represent a combination of circuitry and executable instructions to select a tap technology based on a mapping of selection criteria to a tap technology.

The selection criteria can include a set of parameters to evaluate a tap request to tap technology available in the network. Example selection criteria can include a tap domain, a sink class, a device class, a device capability, a tap duration, a tap granularity, and the like. The selection criteria can be identified by comparing the set of tap arguments (e.g., network element primitives) to a mapping of arguments to selection criteria. For example, the mapping can identify the tap domain based on a resulting set of network elements on which the tapping should be configured derived from the network element primitives of the set of tap arguments. For another example, the mapping can identify the sink class based on where the tapped traffic would ultimately reach, such as a capture server, an intrusion prevention system ("IDS"), an intrusion detection system ("IDS"), and the like. For yet another example, the mapping can identify the device class (e.g., whether the network elements are edge switches, virtual switches, or core switches) and device capabilities (e.g., the tapping protocols supported by the devices of the tap domain) of the network elements.

The selector engine 106 can automatically select from one of the available tap technologies based on a combination of the factors used as selection criteria (which may include configuration options set by a network administrator). The mapping (or the instructions of the selector engine) can include ranges and preference ordering to facilitate identification of a "best match" selection. For example, each available tap technology can be represented in a data structure of ranges of selection criteria. For example, an SFLOW tap technology can be represented in a data structure that specifies a duration threshold and multiple tap source above a threshold to choose SFLOW as a preferred tap technology. For another example, a NETFLOW tap technology can be represented as selection criteria isolated to IP-based addressing and router-level network elements. For yet another example, a mirroring tap technology can be represented as a request for a set of ports with a sink class of IPS or IDS. The selector engine 106 (as well as the moderator engine 110 as discussed below) is to select a network element of the tap domain that has the device capability to perform the tap technology according to the set of tap arguments, such as selecting a network element capable of satisfying a tap duration (i.e., the time period to tap and/or the time intervals to tap) and a tap granularity (i.e., the degree of copying and/or class of information to tap).

The configurator engine 108 represents any circuitry or combination of circuitry and executable instructions to configure a network element with a tap technology. For example, the configurator engine 108 can represent a combination of circuitry and executable instructions to configure a first network element of a plurality of network elements (e.g., a network element in the tap domain of the selection criteria) associated with the tap technology based on the set of tap arguments and a tap technology syntax of the tap technology. The configurator engine 108 can adjust settings of a network element in accordance with the tap technology and can obtain the syntax of the protocol used by the tap technology to be setup. For example, the manual changes that a network administrator would perform on a network element to adapt the network element to copy traffic in accordance with the tap request can be performed by the configurator engine 108.

The moderator engine 110 represents any circuitry or combination of circuitry and executable instructions to maintain a network tap configuration based on a network event. For example, the moderator engine 110 can represent a combination of circuitry and executable instructions to adjust or redeploy a given tap configuration based on network changes (represented as events of the network). For another example, the moderator engine 110 can represent a combination of circuitry and executable instructions to auto-switch (i.e., switch automatically and/or autonomously) between tap technologies based on an event that affects the selection criteria, such as a period of tapping or a granularity of tapping. Adjustment of a network tap configuration can include modifying the configuration of the network element based on, for example, a change in location of monitored traffic. Redeployment of a network tap configuration can include terminating a tap configuration on a first network element and enabling a tap configuration on another network element, such as a network element outside of the original tap domain when an event changes the tap domain such as when the target traffic leaves the tap domain. A network event can be logged and/or identified at a network management source. For example, the network management source can include protocol information and network management information, such as a log events on the network associated with the type of management performed by the network management source.

The moderator engine 110 can be adapted or modified based on user input from the network administrator, such as setting tolerances or event types to initiate a change in the network tap configuration. For example, the moderator engine 110 can change the network tap configuration (e.g., configuration of devices of the network in the tap domain) by changing at least one of a tap technology, a tap domain, a user domain, and a tap duration based on a threshold set by a tap technology setting. A change in the tap technology can be from a first tap technology to a second tap technology available from the tap domain when a threshold is achieved (such as a security threshold). A change in the tap domain from a first tap domain to a second tap domain can include a second network element of the plurality of network elements when a network traffic location changes. A change in the user domain can be from a first set of users to a second set of users when membership of a tap user group argument of the set of tap arguments changes. A change in the tap duration can be from a first duration to a second duration based on a logon-logoff event associated with a user tap argument, such as event information from a lightweight directory access protocol ("LDAP") application.

The gather engine 112 represents any circuitry or combination of circuitry and executable instructions to maintain information regarding the network and/or the tap request. For example, the gather engine 112 can represent a combination of circuitry and executable instructions to update configuration options specified by a network administrator, manage a plurality of device capabilities offered by a plurality of network elements of the tap domain, and generate a list of available tap technologies offered by the plurality of network elements based on the configuration options. The gather engine 112 can be utilized by the other engines 104-110 to obtain parameters used by the engines 104-110.

The data store 102 can contain information utilized by the engines 104, 106, 108, 110, and 112. For example, the data store 102 can store a network element primitive, a tap configuration, a set of tap arguments, a mapping, selection criteria, a tap technology profile, a device profile, a mapping, a knowledge base (e.g., mappings can be supplied as part of a knowledge base of network administrator expertise), and the like.

FIG. 2 depicts the example system 200 can comprise a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a translator module 204, a selector module 206, a configurator module 208, a moderator module 210, and a gather module 212. The translator module 204, the selector module 206, the configurator module 208, the moderator module 210, and the gather module 212 represent program instructions that when executed function as the translator engine 104, the selector engine 106, the configurator engine 108, the moderator engine 110, and the gather engine 112 of FIG. 1, respectively. The processor resource 222 can carry out a set of instructions to execute the modules 204, 206, 208, 210, 212, and/or any other appropriate operations among and/or associated with the modules of the system 200. For example, the processor resource 222 can carry out a set of instructions to identify selection criteria based on a set of tap arguments derived from a tap request and a first mapping of keywords to switch-port tuples, select a tap technology based on the selection criteria and a second mapping of selection criteria to tap technology, identify a syntax based on the tap technology and the device class, and configure a network element of the tap domain using the syntax. For another example, the processor resource 222 can carry out a set of instructions to translate a tap request to a set of tap arguments based on a plurality of mappings, monitor a tap domain, identify an event of the network from information in a network management source, and adjust a configuration of the network element based on an event of the network or redeploy the configuration of the network element on an updated tap domain with an updated network tap configuration.

Figure 4:
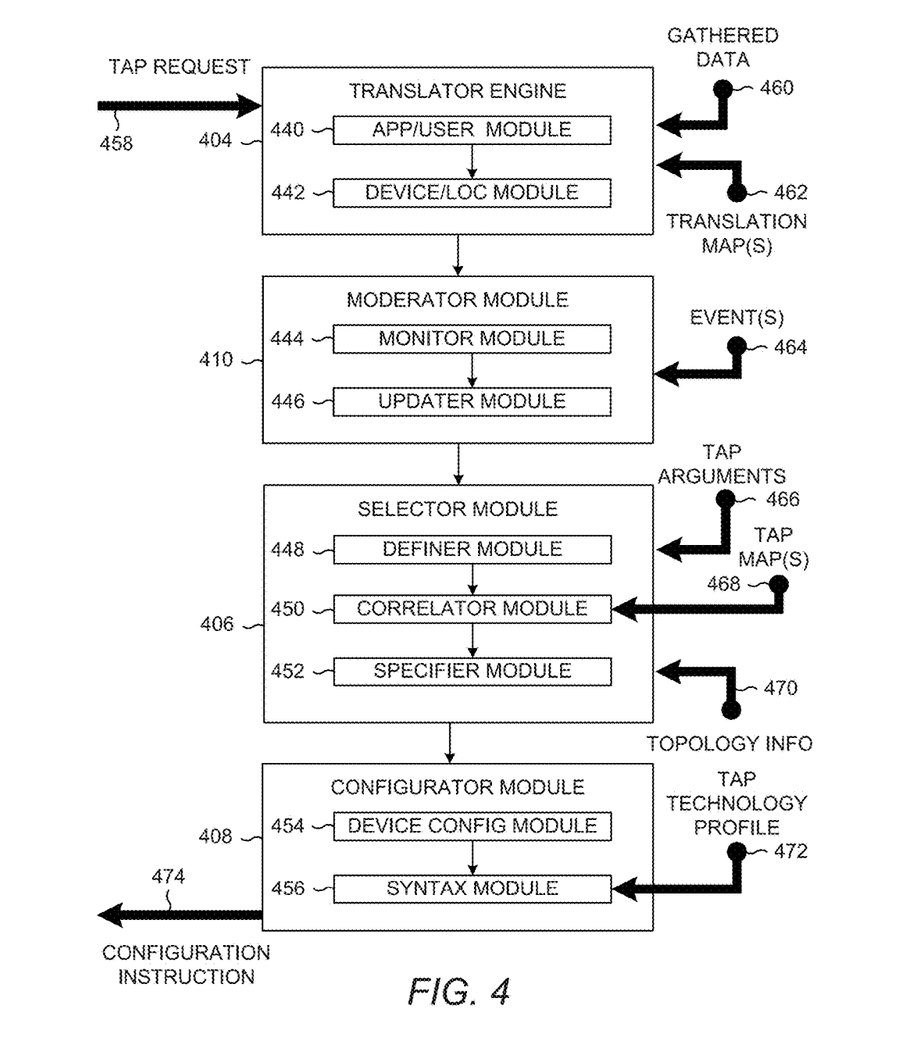
FIG. 4 depicts example modules used to implement example network tap systems.

Although these particular modules and various other modules are illustrated and discussed in relation to FIG. 2 and other example implementations, other combinations or sub-combinations of modules can be included within other implementations. Said differently, although the modules illustrated in FIG. 2 (and other example implementations) perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 4 depicts yet another example of how functionality can be organized into modules.

The processor resource 222 is any appropriate circuitry capable of processing (e.g., computing) instructions, such as one or multiple processing elements capable of retrieving instructions from the memory resource 220 and executing those instructions. For example, the processor resource 222 can be a central processing unit ("CPU") that enables tap technology selection by fetching, decoding, and executing modules 204, 206, 208, 210, and 212. Example processor resources 222 include at least one CPU, a semiconductor-based microprocessor, an application specific integrated circuit ("ASIC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium is any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 and/or the data store can be distributed across devices. The memory resource 220 and the data store 202 can represent the same physical medium or separate physical mediums. The data of the data store 202 can include representations of data and/or information mentioned herein.

In the discussion herein, the engines 104, 106, 108, 110, and 112 of FIG. 1 and the modules 204, 206, 208, 210, and 212 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the system 200 can include the executable instructions can be part of an installation package that when installed can be executed by the processor resource 222 to perform operations of the system 200, such as methods described with regards to FIGS. 4-7. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
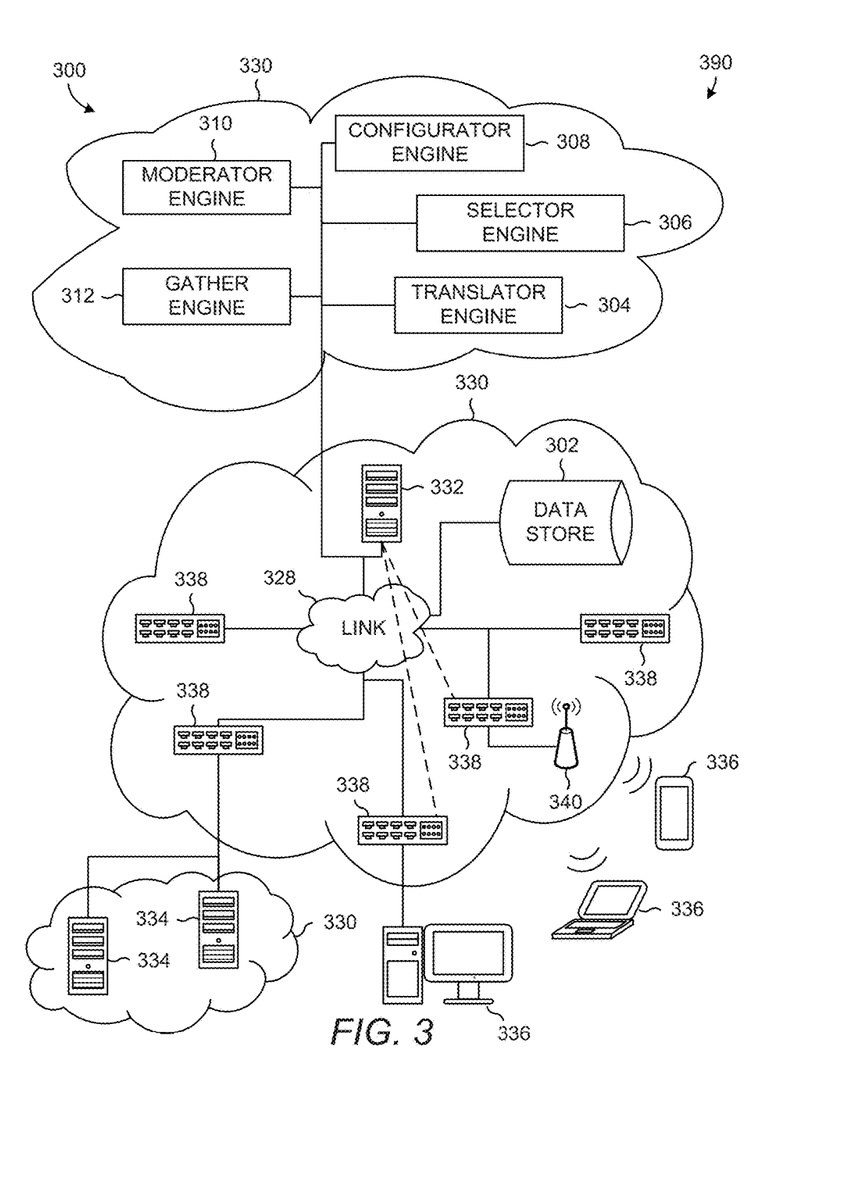
FIG. 3 depicts an example environment in which various network tap systems can be implemented.

FIG. 3 depicts example environments in which various example network tap systems can be implemented. The example environment 390 is shown to include an example system 300 for tap technology selection. The system 300 (described herein with respect to FIGS. 1 and 2) can represent generally any circuitry or combination of circuitry and executable instructions to select a tap technology based on selection criteria. The system 300 can include a translator engine 304, a selector engine 306, a configurator engine 308, a moderator engine 310, and a gather engine 312 that are the same as the translator engine 104, the selector engine 106, the configurator engine 108, the moderator engine 110, and the gather engine 112 of FIG. 1, respectively, and the associated descriptions are not repeated for brevity. As shown in FIG. 3, the data store 302 (which is the same as data stores 102 of FIGS. 1 and 202 of FIG. 2) and the engines 304, 306, 308, 310, and 312 can be integrated into a compute device, such as a controller 332, or distributed across multiple compute devices. The engines 304, 306, 308, 310, and 312 can be integrated via circuitry or as installed instructions into a memory resource of the compute device.

The example environment 390 can include compute devices that are elements of the network, such as a controller 332, service devices 334, user devices 336, switches 338, and wireless access point device 340. The controller 332 represents generally any compute device capable of managing the network. For example, the controller 332 can be a SDN controller that manages flows of traffic through the network 330. The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application. The switches 338 represent any network device capable of connecting devices of the network together. For example, a switch 338 can retain local routing information of paths describing how to transfer packets from a source to a destination. In FIG. 3, the dotted lines represent logical connections between the controller 332 and the switches 338, which may or may not be physically connected directly. For example, the switches 338 connected via dotted lines to the controller 332 can represent switches 338 selected as part of the tap domain to copy traffic to the controller 332.

The compute devices can be located on separate networks 330 or part of the same network 330. The example environment 390 can include any appropriate number of networks 330 and any number of the networks 330 can include a cloud compute environment, such as a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g., reside and/or execute on a virtual shared pool of resources).

A link 328 generally represents one or a combination of a cable, wireless connection, fiber optic connection, or remote connections via a telecommunications link, an infrared link, a radio frequency link, or any other connectors of systems that provide electronic communication. The link 328 can include, at least in part, intranet, the Internet, or a combination of both. The link 328 can also include intermediate proxies, routers, switches, load balancers, and the like.

Referring to FIGS. 1-3, the engines 104, 106, 108, 110, and 112 of FIG. 1 and/or the modules 204, 206, 208, 210, and 212 of FIG. 2 can be distributed across devices 332, 334, 336, 338, 340, or a combination thereof. The engine and/or modules can complete or assist completion of operations performed in describing another engine and/or module. For example, the selector engine 306 of FIG. 3 can request, complete, or perform the methods or operations described with the selector engine 106 of FIG. 1 as well as the translator engine 104, the configurator engine 108, the moderator engine 110, and the gather engine 112 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 can perform example methods described in connection with FIGS. 4-7.

FIG. 4 depicts example modules used to implement example network tap systems. The example modules of FIG. 4 generally include a translator module 404, a selector module 406, a configurator module 408, and a moderator module 410 which function similar to, and represent, the translator module 204, the selector module 206, the configurator module 208, and the moderator module 210 of FIG. 2. For brevity, the associated descriptions have not been repeated in their entirety. The example modules of FIG. 4 can be implemented on a compute device, such as an SDN controller.

The tap request 458 can activate the translator module 404 to cause a processor resource to translate the tap request 458, identify keywords, and identify a set of tap arguments. The processor resource that executes the translator module 404 can utilize gathered data 460 of the network (and tap technologies) and a translation map 462 (or translation maps) to identify the set of tap arguments. The translator module 404 can include program instructions, such as an app/user module 440 and a dev/loc module 442, to facilitate translation of particular classes of information. The app/user module 440 represents program instructions that when executed cause a processor resource to identify network element primitives based on keywords associated with applications and users. The dev/loc module 440 represents program instructions that when executed cause a processor resource to identify network element primitives based on a keywords associated with devices and locations. Based on the translation, the boundaries of what to tap can determined.

The moderator module 410 can include program instructions, such as monitor module 444 and an updater module 446, to adapt the tap request to changes in the network based on events 464. The monitor module 444 represents program instructions that when executed cause a processor resource to monitor the network for events 464. The updater module 446 represents program instructions that when executed cause a processor resource to modify the bounds of the tap request based on the monitored events 464. The processor resource executing the moderator module 410 can activate the processor resource executing selector module 406 to adapt the network tap configuration to the events 464.

The selector module 406 can include program instructions, such as a definer module 448, a correlator module 450, and a specifier module 452, to enable the selection of a tap technology. The definer module 448 represents program instructions that when executed cause a processor resource to define a set of selection criteria based on the set of tap arguments 466 translated from the processor resource executing the translator module 404. The correlator module 450 represents program instructions that when executed cause a processor resource to identify a tap technology that suits the selection criteria using a tap map 468 (or tap maps). The tap map 468 can include a list of tap technologies and their associated ratings in comparison to the selection criteria to provide for determination of which tap technology fits the selection criteria derived from the tap request. The specifier module 452 represents program instructions that when executed cause a processor resource to select a network element having the tap technology identified by the processor resource executing the correlator module 450 and can use topology information 470 to assist in making the determination as to which device(s) are to be configured.

The configurator module 408 can include program instructions, such as a device config module 454 and a syntax module 456, to provide configuration details to a network element. The device config module 454 represents program instructions that when executed cause a processor resource to identify the device configuration state to enable on the network element selected by the processor resource executing the specifier module 452. The syntax module 456 represents program instructions that when executed cause a processor resource to identify the syntax used by the tap technology and configure (e.g., modify the settings of) the network element using the syntax of the tap technology. The syntax can be identified based on a tap technology profile 472, which is a data structure formed to contain attributes of a tap technology. The configuration instruction 474 can be sent to the network element to configure the network element to tap traffic according to the confines of the tap request.

Figure 5:
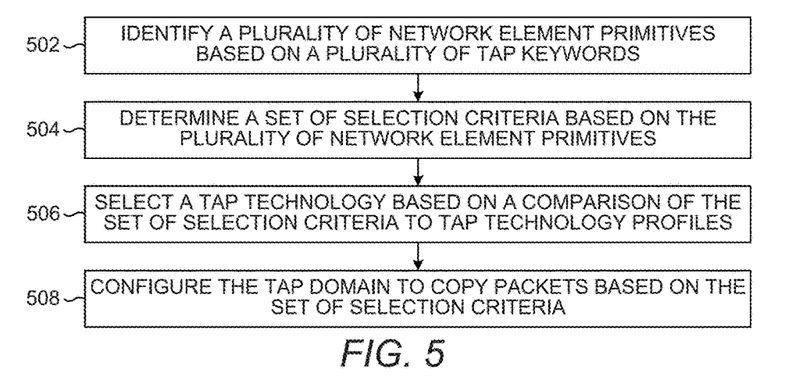
FIGS. 5-7 are flow diagrams depicting example methods for tap technology selection.
Figure 6:
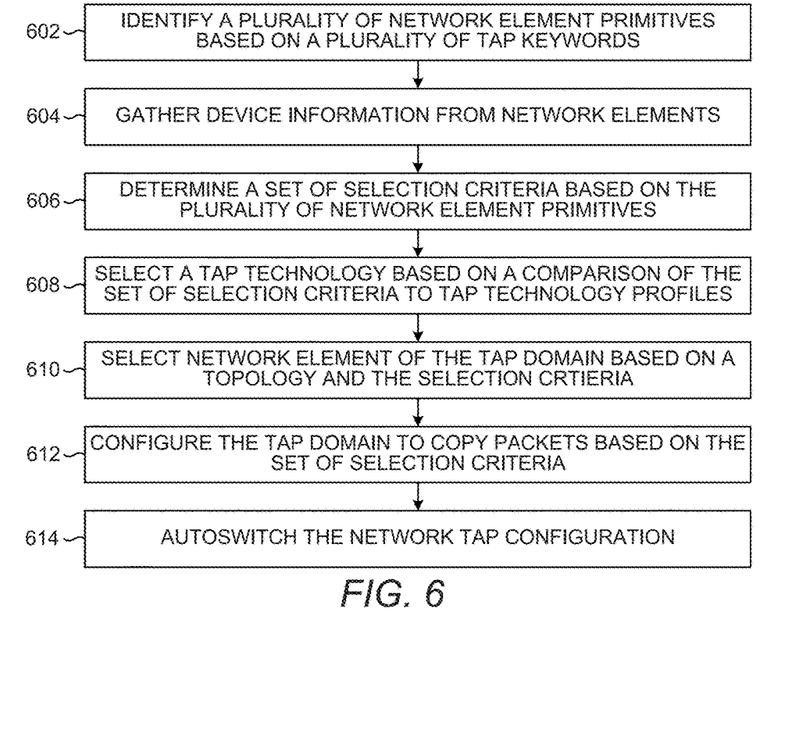
Figure 7:
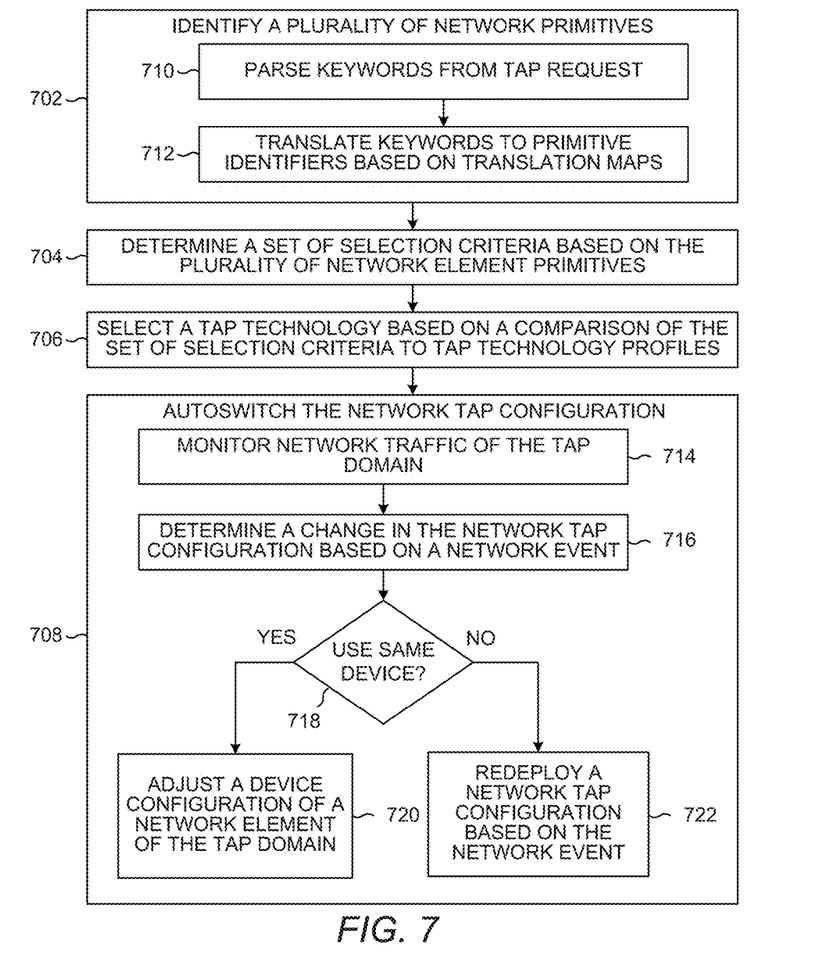

FIGS. 5-7 are flow diagrams depicting example methods for tap technology selection. Referring to FIG. 5, example methods for tap technology selection can generally comprise identifying a plurality of network element primitives based on a plurality of tap keywords of a tap request, determining a set of selection criteria based on the plurality of network element primitives, selecting a tap technology based on a comparison of the set of selection criteria to a tap technology profile, and configuring a tap domain to copy packets based on the set of selection criteria.

At block 502, a plurality of network element primitives are identified based on a plurality of tap keywords. The tap keywords are parsed from a tap request and compared to a mapping that contains the plurality of tap keywords. The mapping can be updated by a network administrator or autonomously to ensure the phrases of the tap request are properly translated to network element primitives.

At block 504, a set of selection criteria is determined based on the plurality of network element primitives. The selection criteria can include a tap domain, a device profile, and a sink class where the network element primitives describe the specific elements to tap (i.e., the tap domain and device profiles) and the destination and/or application of the tap request (i.e., the sink class). A device profile can include a device class (i.e., the type of network element) and the device capabilities (e.g., the tap technologies supported by the network element) associated with the device class.

At block 506, a tap technology is selected based on a comparison of the set of selection criteria to tap technology profiles. For example, the comparison to a tap technology profile (i.e., a data structure describing the tap technology requirements and/or acceptable selection criteria) can deduce the best fit of tap technologies available in the tap domain. Once the tap technology is selected, the tap domain can be configured to copy packets based on the selection criteria at block 508. For example, a device within the tap domain having the best fit tap technology can be configured to setup tapping using the selected tap technology within the parameters identified by the tap request (e.g., the set of tap arguments and/or the selection criteria). For another example, a flow table distributed to the tap domain could be updated with a flow entry to duplicate packets at a granularity specified by the selection criteria and forward them according to the tap request parameters.

FIG. 6 includes blocks similar to blocks of FIG. 5 and provides additional blocks and details. In particular, FIG. 6 depicts additional blocks and details generally regarding gathering device information of the network and autoswitching the network tap configuration. Blocks 602, 606, 608, and 614 are the same as blocks 502, 504, 506, and 508 of FIG. 5 and, for brevity, their respective descriptions are not repeated.

At block 604, device information is gathered from the network elements of the network. The device information can be used to create device profiles and other information used to maintain mappings or otherwise assist the selection criteria in selecting the proper tap technology. The device information gathered at block 604 can include topology information and assist the selection of a network element of the tap domain based on the topology of the network and the selection criteria at block 610.

At block 614, the network tap configuration can autoswitch. For example, an event may occur on the network and the best fit tap technology could change to a different tap technology from the original selected. Using the selection mechanisms described herein with regards to the selector engine 106 and the moderator engine 110, the network tap configuration should be adaptable to changes in the network and changes to parameters of the tap request, such as the movement of a user from a first wireless access point connected to a first switch to a second wireless access point connected to a second switch when the traffic of the user is being tapped.

FIG. 7 includes blocks similar to blocks of FIG. 6 and provides additional blocks and details. In particular, FIG. 7 depicts additional blocks and details generally regarding identifying a plurality of network element primitives and autoswitching the network tap configuration. Blocks 702, 704, 706, and 708 are similar to blocks 602, 606, 608, and 614 of FIG. 6, and, for brevity, their respective descriptions are not repeated in their entirety.

The identification of a plurality of network element primitives at block 702 can include parsing and translating. At block 710, keywords are parsed from the tap request. The keywords can be parsed using any appropriate parsing method such as the use of pattern matching, regular expressions, language analysis, and the like. At block 712, the keywords are translated to primitive identifiers based on translation maps. The keywords can be looked up in the translation maps to find associated entries of primitive identifiers. For example, identification of a plurality of network element primitives can include at least one of translating a tap location based on a location tap keyword, translating a user based on a user tap keyword, translating a protocol based on a first application tap keyword, translating a transport layer port based on a second application tap keyword, and translating a network element identifier based on a device tap keyword. The primitive identifiers can be directly translated to particular network element primitives or identify rules for using information gathered from the network to identify the network element primitives.

At block 708, autoswitching can include monitoring, determining a change, and identifying the type of change to make on the network tap configuration. At block 714, network traffic of the tap domain is monitored. The network traffic is monitored to identify events (such as changes in state of a switch and/or port, changes in user activity, or changes in state of threat vulnerability) that may affect the tap configuration. For example, a first switch can become overprovisioned with tap requests and some of the requests can be offloaded to a second switch based on a utilization event. The monitored information can be used to determine a change in the network tap configuration based on a network event at block 716. The change in network tap configuration can be represented as a change in the selection criteria used to identify the tap technology (and/or particular device and particular configuration of the device). A change could include changing which tap technology to use, which device to do the tapping, and what is being tapped. Based on the degree of severity of the determined change at block 718, a device configuration may be altered at block 720 or a network tap configuration may be redeployed at block 722. For example, if a tap technology is to be changed and the device is configurable to use the new tap technology, then the device configuration of the network element in the current tap domain can be adjusted accordingly (e.g., from tapping traffic using a first tap protocol to a second tap protocol) at block 720. If the change in the network tap configuration is significant enough that the previously used device is no longer a best fit according to the selection criteria, then a new device in the new tap domain can be selected to perform the tapping in accordance with the updated selection criteria. For example, the redeployment of the network tap configuration can be at least one of redeployment in a different tap domain and a different tap technology based on the network event. In this manner, the network tap configuration can follow the subject of the tap request as the subject moves or otherwise changes in the network (e.g., follow a user as the user moves to different wireless access points of the network). In this manner, the subject being tapped can be the focus of the administrator and the network tap configuration (e.g., the tap technology) used to tap the subject can change dynamically based on the circumstances.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A network tap system comprising:
  a translator engine to translate a tap request into a set of tap arguments based on a first mapping of keywords to primitives, the set of tap arguments to include a network element primitive;
  a selector engine to:
    identify selection criteria based on the set of tap arguments and a second mapping of arguments to selection criteria; and
    select a tap technology based on a third mapping of selection criteria to a tap technology, the selection criteria to include a tap domain and a sink class; and
  a configurator engine to configure a first network element of a plurality of network elements associated with the tap technology based on the set of tap arguments and a tap technology syntax of the tap technology, the first network element to be within the tap domain.

2. The system of claim 1, comprising:
  a moderator engine to maintain a network tap configuration based on a network event, the network tap configuration to include the tap technology and a device configuration of the tap domain.

3. The system of claim 2, wherein the selection criteria further includes a tap duration, a tap granularity, a device class, and a device capability and the moderator engine is to:
  change the network tap configuration based on the network event, the network tap configuration to change at least one of:
    the tap technology from a first tap technology to a second tap technology available from the tap domain when a security threshold is achieved;
    the tap domain from a first tap domain to a second tap domain including a second network element of the plurality of network elements when a network traffic location changes;
    a user domain from a first set of users to a second set of users when membership of a tap user group argument of the set of tap arguments changes; and
    the tap duration from a first duration to a second duration based on a logon-logoff event associated with a user tap argument.

4. The system of claim 1, wherein the keywords are real-world entities and the translator engine comprises:

a location translator engine to identify the network element located in a tap location based on a location keyword;

a user translator engine to identify the network element associated with a user to tap based on a user keyword;

an application translator engine to identify the network element based on an application keyword; and a device translator engine to identify the network element based on a device keyword.

5. The system of claim 1, comprising a gather engine to:

maintain configuration options specified by a network administrator;

maintain a plurality of device capabilities offered by a plurality of network elements of the tap domain; and generate a list of available tap technologies offered by the plurality of network elements based on the configuration options.

6. A non-transitory computer readable storage medium comprising a set of instructions executable by a hardware processor resource of a network tap system to:

identify selection criteria based on a set of tap arguments derived from a tap request and a first mapping of keywords to switch-port tuples;

select a tap technology based on the selection criteria and a second mapping of selection criteria to tap technology, the selection criteria to include a tap domain, a device class, a sink class, and a device capability;

identify a syntax based on the tap technology and the device class;

using the syntax, configure a network element of the tap domain that has the device capability to perform the tap technology based on the set of tap arguments, the network element capable of satisfying a tap duration and a tap granularity.

7. The medium of claim 6, wherein the first mapping and second mapping are supplied as part of a knowledge base of network administrator expertise and the set of instructions is executable by the processor resource to:

translate a tap request to the set of tap arguments based on a plurality of maps, the plurality of maps to include location information, user information, application information, and device information.

8. The medium of claim 6, wherein the set of instructions is executable by the processor resource to:

monitor a network comprising the tap domain; and at least one of:

adjust a configuration of the network element based on an event of the network; and redeploy the configuration of the network element on an updated tap domain with an updated network tap configuration.

9. The medium of claim 8, wherein the set of instructions is executable by the processor resource to:

identify the event from information of a network management source, the network management source to include protocol information and network management information.

10. The medium of claim 8, wherein the set of instructions is executable by the processor resource to:

adjust the configuration of the network element based on a change in location of monitored traffic; and redeploy the configuration of the network element of the tap domain to a network element outside the tap domain when the target traffic leaves the tap domain.

11. A method for tap technology selection comprising:

identifying, by a network tap system comprising at least a hardware processing resource, a plurality of network element primitives based on a plurality of tap keywords parsed from a tap request and a first mapping that contains the plurality of tap keywords;

determining, by the network tap system, a set of selection criteria based on the plurality of network element primitives, the set of selection criteria to include a tap domain, a device profile, and a sink class;

selecting, by the network tap system, a tap technology based on a comparison of the set of selection criteria to a tap technology profile; the tap technology profile in a format comparable to the set of selection criteria; and configuring the tap domain to copy packets based on the set of selection criteria using a syntax of the tap technology.

12. The method of claim 11, comprising:

determining. by the network tap system, a change in a network tap configuration based on a network event identified from monitored network traffic of the tap domain; and adjusting, by the network tap system, a device configuration of a network element of the tap domain based on the network event.

13. The method of claim 11, comprising:

redeploying, by the network tap system, based on a network event, a network tap configuration to at least one of:

a different tap domain; and a different tap technology.

14. The method of claim 11, comprising:

gathering, by the network tap system, device information from the tap domain;

selecting, by the network tap system, a network element of the tap domain to configure based on a topology of the tap domain and the set of selection criteria; and configuring, by the network tap system, a flow entry of a flow table of the network element to copy packet information at a granularity specified by the set of selection criteria.

15. The method of claim 11, wherein identifying a plurality of network element primitives comprises at least one of:

translating, by the network tap system. a tap location based on a location tap keyword;

translating, by the network tap system, a user based on a user tap keyword;

translating, by the network tap system, a protocol based on a first application tap keyword;

translating, by the network tap system, a transport layer port based on a second application tap keyword; and translating, by the network tap system, a network element identifier based on a device tap keyword.

* * * * *